3,112,175
PROCESS FOR OBTAINING SODIUM CHLORIDE WITH A DECREASED TENDENCY TO AGGLOMERATE AND USE OF THE PROCESS FOR PREVENTING THE AGGLOMERATE OF SOLID SODIUM CHLORIDE
Martin Schultze, Hans Severin, Karl-August Hölscher, and Peter Rosenbaum, all of Rheinberg, Rhineland, Germany, assignors to Deutsche Solvay-Werke Gesellschaft mit beschrankter Haftung, Solingen-Ohligs, Germany
No Drawing. Filed May 25, 1961, Ser. No. 122,051
Claims priority, application France May 27, 1960
18 Claims. (Cl. 23—89)

The present invention relates to a process for obtaining sodium chloride with a decreased tendency to agglomerate by evaporating brine in the presence of small amounts of added substances, and also the use of these added substances for preventing the agglomeration of salt obtained in other ways when it is exposed during storage to fluctuations in temperature and/or the degree of moisture of the air. The invention further relates to the salts obtained which no longer agglomerate to solid masses.

It is known that the agglomeration of crystalline substances is due to the formation of a saturated solution on the surface of the crystals by the solution of a certain part of the substance in moisture, for example condensed from the atmosphere, and subsequent evaporation of this saturated solution. This causes the formation of "bridges" between the separate crystals and finally their mutual association to a solid agglomerate.

Meanwhile, it is known (I. Whetstone, Discussions of the Faraday Society, 1949, No. 5, page 266) that substances which are able to modify the crystalline nature of a substance also enable the agglomeration of this substance under the influence of changes of temperature and degree of moisture to be controlled and prevented. It is also known (French Patent No. 1,013,620) that compounds with octahedral coordinated complex ions, especially the ferro- and ferri-cyanides of the alkali metals, are very active agents for modifying the crystal structure of sodium chloride, so that, when the saturated salt solutions are evaporated in the presence of these complex cyanides, a free-flowing dendritic salt with a low powder density is formed. However, the dendritic crystals so obtained are extraordinarily fragile and disintegrate when they are compressed, so that the powder density increases with the time.

It has therefore been proposed in the French Patent No. 1,097,493 to prevent the agglomeration of solid sodium chloride which is present in the usual cubic crystalline state by spraying the salt with a small quantity of a solution of soluble ferro- or ferri-cyanides or cadmium salts, and then homogenising the mixture in a suitable manner. The sodium chloride so treated no longer agglomerates.

The use of complex cyanides for this purpose, however, presents some disadvantages. In particular, blue discolorations appear now and again in the salt so treated which are caused by traces of iron or rust.

The present invention eliminates the disadvantages indicated and makes it possible to obtain a sodium chloride which has no tendency to discolour and has a decreased tendency to agglomeration.

The process according to the invention for the preparation of such a salt comprises evaporating a saturated brine in the presence of zirconium salts, the latter being added particularly in amounts of 0.005 to 1 g. of zirconium salt per kg. of brine, or treating a salt present in the solid state, which may have the usual cubic crystal form, with a small quantity of a zirconium salt. Apart from this, the surprising fact was ascertained that the pronounced action of the zirconium salts as agents for preventing agglomeration may be further greatly improved when they are used simultaneously with certain additional substances, which alone also show an anti-agglomerating action—although considerably smaller—especially those which in addition to others are mentioned as components of anti-agglomeration agents in the French Patent 1,241,909 and in the German application No. D 32 367 IVa/121.

Among the substances which may be used together with the zirconium salts and—probably by complex formation—increase their activity, are to be mentioned hydroxycarboxylic acid such as tartaric acid, or citric acid, as well as, especially, the alkali metal salts of such acids, and also mixtures of these acids with alkali metal hydroxides. In the same way oxalic acid can also be used, of course only in cases where the toxicity of this substance is not objectionable. The acid is desirably added in an amount equal to 0.5 to 4 moles per mole of zirconium salt and, when an alkali metal hydroxide is used, it should be present in an amount equal to 1 to 4 moles per mole of the acid.

When the addition is made to the solid salt, the amount of zirconium salt added, calculated as Zr, amounts to about 0.0005 to 0.1%, preferably 0.00075 to 0.1%, by weight of the salt to be treated. Zirconium oxychloride, being soluble in water is especially suitable as the additive but other zirconium salts such as, say, sulphates or basic nitrates, being likewise water soluble, may also be used.

The additive may be admixed with the solid salt in a different way. A solution of the additive may be prepared and the salt sprayed therewith. If desired, however, the components from which the added substance can be formed may also be added to the salt in separate solutions and thus the actual additive can be formed on the spot. Finally, it is also possible to mix the added substances or the components from which they may be formed, with the salt in the solid state, for example with a salt which issues from a centrifuge.

Since the zirconium salts are colourless, the sodium chloride treated therewith also remains uncoloured, and owing to the non-poisonous nature of zirconium salts— cf. for example, the feeding experiments of Richet, Gardner, Goodbody, Compt. Rend. Acad. Sci., Paris, 1925, 181, 1105—sodium chloride which contains small quantities of these salts may also be used for edible purposes, e.g. for the preservation of foodstuffs.

The invariability of the colour of the salt treated according to the invention is also of advantage in other purposes of use, e.g. salting out of organic chemical products, regeneration of ion exchangers.

The invention is further described in the following examples. These examples serve to illustrate the invention more precisely and do not limit its scope, within which numerous possible variations are given.

In the examples, the activity of the various additives for preventing agglomeration was determined in the following way: The pressure was measured which was necessary to destroy slightly conical frustum-shaped test bodies with the measurements: surface of base 29.2 cm.$^2$, surface of top 28.3 cm.$^2$, height 6 cm., the test bodies consisting either of treated or untreated salt. These test bodies were obtained by means of frustum-shaped metal moulds. For this purpose the samples of salt were treated with 3% by weight of water and dried in the moulds for about 40 hours at 90° C. The test bodies were then removed from the moulds and the pressure under which they broke up determined by means of a hydraulic press.

EXAMPLE 1

A rock salt powder is treated with 500 mg. of zirconium oxychloride per kg. of salt. The zirconium salt is dissolved in the water added to the sample of salt. After drying in the mould, a pressure of about 4.2 kg./cm.$^2$ is necessary to destroy the test body, while a test body produced under the same conditions from untreated salt of the same composition needs a pressure of 27 kg./cm.$^2$ for its destruction.

EXAMPLE 2

Rock salt with a grain size between 0.15 and 0.5 mm. is treated with zirconium oxychloride in an amount of 50 mg. ZrOCl$_2$ per kg. NaCl and sodium oxalate, a molar ratio of oxalate-ZrOCl$_2$ of 1:1 being used. The added substances may be admixed either in the solid state or in solution. The two components may also be added in the form of separate solutions, however, in which case the actual additive is formed on the spot. After suitable homogenisation, test bodies are prepared in the manner indicated from the treated salt and after 40 hours' drying time the breaking load is determined. It is found that a pressure of 2 kg./cm.$^2$ must be exerted to destroy the samples, while a pressure of 12.2 kg./cm.$^2$ is necessary to crush test samples from untreated salt which had been prepared under the same conditions.

The same results are obtained when another zirconium salt, e.g. the nitrate, is used.

EXAMPLE 3

Rock salt of grain size between 0.15 and 0.5 mm. is treated with a solution of zirconium oxychloride and sodium oxalate. The two components are used therein in the molar ratio 1:1, and 150 mg. of the zirconium oxychloride are used to 1 kg. of sodium chloride. The salt provided with the additives is mixed in a suitable manner, and the pressure necessary for the destruction of the test samples is determined after 40 hours' drying. This amounts to 1.3 kg./cm.$^2$ as compared with 15.0 kg./cm.$^2$ in the case of test samples of untreated salt.

EXAMPLE 4

A saltworks salt is treated according to the invention with zirconium oxychloride in conjunction with sodium tartrate. The following table shows the notable agglomeration-preventing action which the additive has, independently of whether it is added in a previously prepared solution or in the solid state, or whether, by addition of separate solutions, it is formed in the salt from its components.

| Added substances in mg. per kg. of NaCl (dissolved in 30 ml. of water) | | | Molar ratio | | | Pressure necessary for the destruction of the test samples, kg./m.$^2$ (average values) | |
|---|---|---|---|---|---|---|---|
| ZrOCl$_2$ | Tartaric acid | NaOH | ZrOCl$_2$ | Tartaric acid | NaOH | Treated salt | Untreated salt |
| 100 | 84.2 | 90.0 | 2 : | 2 : | 8 | 0.5 | 35 |
| 50 | 42.0 | 22.4 | 1 : | 1 : | 2 | 1.0 | 35 |
| 25 | 42.1 | 22.5 | 1 : | 2 : | 4 | 1.9 | 35 |
| 25 | 21.0 | 11.2 | 1 : | 1 : | 2 | 2.4 | 35 |
| 25 | 42.1 | ------ | 1 : | 2 : | – | 2.4 | 15 |
| 25 | 21 | ------ | 1 : | 1 : | – | 2.4 | 15 |
| 25 | 10.5 | ------ | 1 : | 0.5 : | – | 5.5 | 15 |
| 15 | 50.4 | ------ | 1 : | 4 : | – | 3.4 | 15 |

EXAMPLE 5

When additions of zirconium oxychloride and sodium tartrate (tartaric acid+NaOH) were made to rock salt with a grain size of 0.15 to 0.5 mm. (the components added in a common solution, 30 cc. of water to 1 kg. of salt), the following results were observed:

| Added substances in mg. per kg. of NaCl (dissolved in 30 ml. of water) | | | Molar ratio | | | Pressure necessary for the destruction of the test samples, kg./m.$^2$ (average values) | |
|---|---|---|---|---|---|---|---|
| ZrOCl$_2$ | Tartaric acid | NaOH | ZrOCl$_2$ | Tartaric acid | NaOH | Treated salt | Untreated salt |
| 100 | 60 | 32 | 1 : | 0.715 : | 1.43 | 14-15 | 2-4 |
| 50 | 30 | 16 | 1 : | 0.715 : | 1.43 | 14-15 | 5-6 |
| 10 | 6 | 3.2 | 1 : | 0.715 : | 1.43 | 14-15 | 9-10 |
| 25 | 21 | 0 | 1 : | 1 : | 0 | 14-15 | 3-4 |
| 25 | 21 | 11.2 | 1 : | 1 : | 2 | 14-15 | 5-6 |

EXAMPLE 6

This example concerns the addition of zirconium oxychloride together with citric acid or sodium citrate. The citrate in the experiments was added separate from the zirconium salt in the form of a solution obtained by neutralisation of citric acid with N-caustic soda solution. The quantities added and the values observed for the breaking load (pressure necessary for the destruction of the test samples) are collected in the table.

0.1% by weight of zirconium, and recovering the sodium chloride as crystals.

| Added substances in mg./kg. NaCl (dissolved in 15 ml. of water in each case) | | Molar ratio | Pressure (kg./cm.$^2$) necessary for the destruction of the test samples (average values) | | | |
|---|---|---|---|---|---|---|
| | | | Saltworks salt | | Rock salt | |
| ZrOCl$_2$ | Neutral sodium citrate | ZrOCl$_2$:Citrate | Without additive | With additive | Without additive | With additive |
| 10 | 12.9 | 3 : 2.7 | 18.2 | ca.10 | ------ | ------ |
| 100 | 121.3 | 3 : 2.5 | 18.2 | 1.5-2 | ------ | ------ |
| 10 | 9.7 | 3 : 2 | ------ | ------ | 21.4 | 9.7 |
| 25 | 36.4 | 3 : 3 | 18.2 | 4.2 | 21.4 | 8.8 |
| 50 | 61.4 | 3 : 2.5 | 18.2 | 2.6 | 21.4 | 8.8 |
| 75 | 95.2 | 3 : 2.6 | 18.2 | 2.1 | 21.4 | 6.5 |
| 100 | 124.6 | 3 : 2.6 | ------ | ------ | 21.4 | 6.8 |
| ZrOCl$_2$ | Citric acid | ZrOCl$_2$:Citric acid | | | | |
| 50 | 58.6 | 1 : 1 | 15 | 3-4 | 14.6 | 14.9 |
| 100 | 118 | 1 : 1 | 15 | 11 | 14.6 | 13.6 |
| 10 | 10.8 | 1 : 1 | 16.8 | 9.7 | 14.3 | 11.7 |
| 25 | 27.0 | 1 : 1 | 16.8 | 3.1 | 14.3 | 15.9 |
| 75 | 80.9 | 1 : 1 | 16.8 | 5.2 | 14.3 | 10.7 |
| 100 | 118 | 1 : 1 | 16.8 | 7.1 | 14.3 | 12.3 |

It is seen from the experimental results that in the case of rock salt, probably on account of the impurities always present therein, it is better to use in some cases alkali metal salts of the complex-forming acids instead of the free acids.

*Comparative Experiments*

For the valuation of the activity of the zirconium salts with and without addition of complex-forming organic acids in comparison with known additives already previously used in edible salts for prevention of agglomeration, further determinations of the breaking load of test samples from rock salt (original grain size 0.15-0.5 mm.) were carried out. The test samples for these were obtained in the manner previously indicated by moistening the salt with 3% by weight of water and drying at about 90° C. for 40 hours in the mould.

Rock salt: Breaking load (average value)
Without additives_____ 22-24
+200 mg. of finely divided silicic acid/kg. salt _____kg./cm.$^2$__ 23.7
+200 mg. of calcium citrate (agent for preventing agglomeration according to British Patent No. 495,239) per kg. of salt kg./cm.$^2$__ 23.5
+200 mg. of calcium lactate (mentioned as anti-agglomerating agent in British Patent No. 478,629) per kg. of salt____kg./cm.$^2$__ 24.3
200 mg. of calcium metasilicate per kg. of salt _____kg./cm.$^2$__ 23.7
+110 mg. of ZrOCl$_2$·5.75H$_2$O+90 mg. of disodium tartrate·2H$_2$O per kg. of salt kg./cm.$^2$ 4.2

What we claim is:

1. A process for preparing sodium chloride of decreased tendency to cake which comprises mixing sodium chloride with a water soluble zirconium salt in a proportion to provide 0.0005 to 0.1% by weight of zirconium based on the sodium chloride, and recovering the sodium chloride as crystals.

2. A process according to claim 1 wherein the zirconium salt in an amount of 0.00075 to 0.1 g. zirconium per 100 g. of sodium chloride is admixed with solid crystalline sodium chloride.

3. A process for preparing sodium chloride of decreased tendency to cake which comprises mixing sodium chloride with zirconium oxychloride in a proportion to provide a sodium chloride product containing 0.0005 to 0.1% by weight of zirconium, and recovering the sodium chloride as crystals.

4. A process for obtaining sodium chloride of decreased tendency to agglomerate which comprises forming a saturated aqueous solution of sodium chloride containing 0.005 to 1 g. of zirconium salt per 1 kg. of solution, evaporating said solution, and recovering the resulting crystals.

5. A process according to claim 4 wherein said zirconium salt is zirconium oxychloride.

6. A process according to claim 4 wherein said zirconium salt is basic zirconium nitrate.

7. A process for preparing sodium chloride of decreased tendency to agglomerate which comprises mixing solid sodium chloride with a water soluble zirconium salt and an auxiliary agent selected from the group consisting of oxalic acid and hydroxy-carboxylic organic acids, mixtures of said acids with 1 to 4 moles of alkali metal hydroxide per mole of acid, and alkali metal salts of said acids, the zirconium salt being added in an amount to provide 0.0005 to 0.1% by weight of zirconium based on said sodium chloride and the auxiliary agent being added in an amount to provide 0.5 to 4 moles of auxiliary agent per mole of zirconium salt, and recovering the sodium chloride in free-flowing crystal form.

8. A process according to claim 7 wherein said zirconium salt is zirconium oxychloride.

9. A process according to claim 7 wherein said zirconium salt is basic zirconium nitrate.

10. A process for preparing sodium chloride of decreased tendency to cake which comprises mixing solid rock salt with zirconium oxychloride, an acid selected from the group consisting of tartaric acid, citric acid, and oxalic acid, and an alkali metal hydroxide, in quantities such as to provide 0.0005 to 0.1% by weight of zirconium based on said sodium chloride, 0.5 to 4 moles of said acid per mole of zirconium oxychloride and from 1 to 4 moles of alkali metal hydroxide per mole of said acid, and recovering the resulting treated solid rock salt.

11. A process according to claim 10 wherein the zirconium oxychloride, the acid and the alkali metal hydroxide are added to the sodium chloride as separate solutions.

12. Undiscolored sodium chloride crystals of reduced tendency to agglomerate which comprises a soluble zirconium salt in an amount of 0.00075 to 0.1% by weight of zirconium based on the weight of said sodium chloride.

13. Undiscolored sodium chloride crystals of reduced tendency to agglomerate which comprises 0.00075 to 0.1% by weight of zirconium in the form of zirconium oxychloride.

14. An undiscolored crystalline saline salt of decreased tendency to agglomerate consisting essentially of a mixture of (1) sodium chloride, (2) a soluble zirconium salt present in an amount of from 0.00075 to 0.1% by weight of zirconium based on said sodium chloride and (3) an auxiliary agent composed of a member of the group consisting of oxalic acid, hydroxy-carboxylic acids and alkali metal salts of said acids, said auxiliary agent being present in an amount equal to 0.5 to 4 moles of said agent per mole of zirconium salt.

15. A salt according to claim 14 wherein said complex-forming agent is an alkali metal tartrate.

16. A salt according to claim 14 wherein said complex-forming agent is an alkali metal citrate.

17. A salt according to claim 14 wherein said complex-forming agent is an alkali metal oxalate.

18. An undiscolored crystalline saline salt of decreased tendency to agglomerate which consists essentially of sodium chloride in admixture with 0.00075 to 0.1% by weight of zirconium oxychloride based on said sodium chloride, 0.5 to 4 moles of tartaric acid per mole of said zirconium oxychloride and 1 to 4 moles of sodium hydroxide per mole of tartaric acid.

References Cited in the file of this patent

UNITED STATES PATENTS

| | | |
|---|---|---|
| 2,030,583 | Haas et al. | Feb. 11, 1936 |
| 2,238,149 | Aeckerle | Apr. 15, 1941 |
| 2,668,750 | Krchma | Feb. 9, 1954 |
| 2,774,672 | Griffith | Dec. 18, 1956 |

FOREIGN PATENTS

| | | |
|---|---|---|
| 495,239 | Great Britain | Nov. 9, 1938 |
| 605,441 | Canada | Sept. 20, 1960 |

OTHER REFERENCES

Ricket et al.: Comptes Rendus (Academy of Science, Paris), volume 181, pages 1105–06 (1925).

Bennett: Concise Chemical and Technical Dictionary, page 1001 (1947), Chemical Publ. Co., N.Y.